US009959480B1

United States Patent
Agrawal et al.

(10) Patent No.: US 9,959,480 B1
(45) Date of Patent: May 1, 2018

(54) PIXEL-STRUCTURAL REFERENCE IMAGE FEATURE EXTRACTION

(71) Applicant: Amazon Technologies, Inc., Seattle, WA (US)

(72) Inventors: Amit Kumar Agrawal, Santa Clara, CA (US); Qiang Liu, Cupertino, CA (US); David Ting-Yu Wu, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/611,403

(22) Filed: Jun. 1, 2017

Related U.S. Application Data

(63) Continuation of application No. 14/729,894, filed on Jun. 3, 2015, now Pat. No. 9,697,433.

(51) Int. Cl.
| | |
|---|---|
| *G06K 9/62* | (2006.01) |
| *G06K 9/34* | (2006.01) |
| *G06K 9/46* | (2006.01) |
| *H04N 7/18* | (2006.01) |

(52) U.S. Cl.
CPC ........... *G06K 9/346* (2013.01); *G06K 9/4652* (2013.01)

(58) Field of Classification Search
CPC .................................. G06K 9/00; G06T 7/00
USPC ........... 382/156, 158, 159; 348/77, 155, 169
See application file for complete search history.

(56) References Cited

U.S. PATENT DOCUMENTS

| | | | | | |
|---|---|---|---|---|---|
| 6,307,560 | B1* | 10/2001 | Kondo | ................. | H04N 7/0137 345/619 |
| 8,116,574 | B2* | 2/2012 | Engels | ................. | G06K 9/6254 382/224 |
| 9,627,532 | B2* | 4/2017 | Gemello | ............. | H01L 29/7848 |
| 9,633,282 | B2* | 4/2017 | Sharma | ................ | G06K 9/6256 |

OTHER PUBLICATIONS

JointType Enumeration. https://msdn.microsoft.com/en-us/library/microsoft.kinect.jointtype(d=printer).aspx, Downloaded Mar. 16, 2015.
Moeslund et al. "A survey of advances in vision-based human motion capture and analysis." Elsevier. ScienceDirect. Computer Vision and Image Understanding 104 (Nov.-Dec. 2006) 90-126.
Plagemann et al. "Real-time Identification and Localization of Body Parts from Depth Images." 2010 IEEE Int'l Conference on Robotics and Automation (ICRA) (May 2010) 3108-3118.
Poppe, Ronald. "Vision-based human motion analysis: An overview." Elsevier. ScienceDirect. Computer Vision and Image Understanding 108 (Jan. 2007) 4-18.

* cited by examiner

*Primary Examiner* — Abolfazl Tabatabai

(74) *Attorney, Agent, or Firm* — Knobbe Martens Olson & Bear LLP

(57) ABSTRACT

Features are disclosed for classifying pixels included in a digital image. Distance information from a pixel to structural reference points, such as skeletal joints, is generated. The distance information is then applied to a pixel classifier to identify one or more classifications for the pixel.

20 Claims, 7 Drawing Sheets

PIXEL-STRUCTURAL REFERENCE IMAGE FEATURE EXTRACTION

CROSS-REFERENCE TO RELATED APPLICATIONS

This application is a continuation of U.S. patent application Ser. No. 14/729,894 filed on Jun. 3, 2015 entitled "PIXEL-STRUCTURAL REFERENCE IMAGE FEATURE EXTRACTION," the disclosure of which is hereby incorporated by reference in its entirety. Furthermore, any and all priority claims identified in the Application Data Sheet, or any correction thereto, are hereby incorporated by reference under 37 C.F.R. § 1.57.

BACKGROUND

With the advent of digital imaging and the corresponding improvements in sensor technology, the amount of data that can be captured in a single image has increased. Various techniques have been developed to parse a given image, to identify features included in the image. One technique is edge detection. In edge detection, color contrasts between pixels in an image are used to identify different regions of the image. For example, in manufacturing, it may be useful to segment images of products on an assembly line by removing the background (e.g., conveyor belt) and to provide an isolated image of the product for further processing (e.g., quality control).

Such techniques rely on uniformity and can provide inaccurate segmentations for images, which include subjects having varied forms, such as those including human subjects. Hence, there is a need for improved systems and methods of extracting features from digital images.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
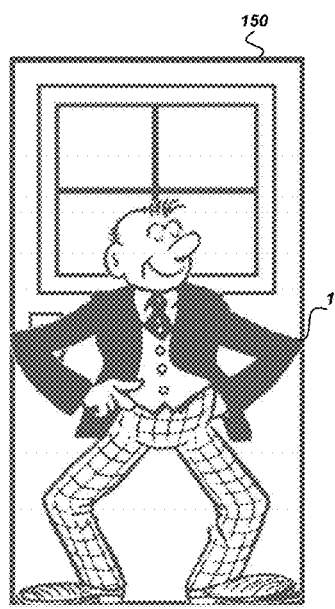
FIG. 1A is a pictorial diagram of an example image upon which feature extraction may be conducted.

Unlike uniformly manufactured objects, non-uniform subjects such as humans, can come in nearly infinite shapes and sizes. This non-uniformity presents a difficulty in accurately extracting features for these subjects. For example, if the goal is to extract apparel worn by a person shown in a digital image, it is desirable to account for the physical structure of the subject to accurately identify items. For instance, a tall, thin person may have pants, which fit differently than a short, stout person.

Traditional feature extraction methods, such as edge detection, may not accurately identify apparel items. One reason is due to the non-uniform nature of the structure of the subjects. Bodies may cast shadows, be positioned differently (e.g., arms crossed, raised, or behind back), and otherwise be represented in a way that does not lend such images to accurate edge detection. Another reason may be due to the use of complementary colors in apparel. Because the colors may not have sufficient contrast to accurately detect an edge, the apparel detected through edge detection alone may provide incorrect identifications.

To improve the accuracy of detection and perform detection in a more resource efficient manner, systems, methods, and devices using a visual feature to describe where apparel, such as clothing, sits on the body are provided. The visual feature may be used to train an image classifier. The image classifier accepts an image of a subject as an input and provides a prediction of all the apparel items worn on a body. The image classifier scans pixels within the image to determine the apparel item most likely represented by the pixel.

The visual feature accounts for the non-uniform nature of the subject. In the case of human subjects, the visual feature is the distance of a given pixel to a structural reference for the human subject. The structural reference may be a skeletal joint.

To compute the visual feature, images of a person, along with a corresponding representation of the locations for his body joints are obtained. One example of the representation may be a skeletal model of the person. The representation may be obtained via a structural modeling system or an image recognition system such as those described in or implemented according to the features described in: Moeslund, et al., "A Survey of Advances in Vision-based Human Motion Capture and Analysis," Computer Vision and Image Understanding 104 (2006) 90-126; Ronald Poppe, "Vision-based Human Motion Analysis: An Overview," Computer Vision and Image Understanding 108 (2007) 4-18; and Plagemann, et al., "Real-time Identification and Localization of Body Parts from Depth Images," in Proceedings of Int'l. Conf. on Robotics and Automation (May 2010), each of which are hereby incorporated by reference in their entirety.

Then for a given image, the body may be extracted such as via image segmentation. For each pixel that is part of the body, a distance between that pixel and each joint for the person shown may be determined. The image classifier can then be trained using this feature using previously labeled clothing items.

The use of the distance information can provide computational efficiencies over traditional image feature extraction methods. For example, the pixel information maintained for each item may include a list of distances to respective structural reference points. Unlike edge detection, which performs computations using a current pixel and surrounding pixels, the distances are computed for the current pixel to at least one structural reference. The efficiency of this computation can be further improved by maintaining the distance information using integer datatypes.

By using structurally oriented visual features, an image including a non-uniform subject can be processed to identify items shown in the picture such as where each clothing article sits on a person's body skeleton. For instance, shirts will sit towards the upper-body joints where pants will sit towards the lower body joints. The features may also be used for other things, such as learning the different ways that people wear their clothing, determining clothing fit, determining body shape, etc.

Although the examples and implementations described herein focus, for the purpose of illustration, on identifying apparel on humans, the features described are readily applicable to other non-uniform subject image feature detection such as animals, buildings, vehicles, or other subjects, which have an underlying structure but may include customized or variable visible features. Various aspects of the disclosure will now be described with regard to certain examples and embodiments, which are intended to illustrate but not limit the disclosure.

One aspect of providing a desirable imaging application, such as a clothing recognition application, is accurately identifying apparel items worn by a subject. In this regard, a structural representation (e.g., a skeletal model) of the subject can be used to generate a new type of pixel data and classify pixels that are associated with a particular apparel item (e.g., a hat, shirt, dress, shoe, etc.) worn by the subject. For each pixel, a distance from the pixel to a structural reference on the subject, such as skeletal joint, is calculated. Using a pixel classifier trained to predict apparel types using these distances, a new image can be processed to accurately identify apparel items shown in the image.

FIG. 1A is a pictorial diagram of an example image upon which feature extraction may be conducted. The image may be captured by a sensor or other imaging device such as a camera. The image may be a still image or a picture included in a sequence of images such as a video. The image shown in FIG. 1A may be considered a raw image. A raw image generally refers to a collection of image data as captured by the sensor. The image data includes information for pixels. The pixel information may include one or more of color information, hue information, brightness information, infrared information, or depth information for pixels included in the image. The image data may also include sensor information indicating characteristics of the sensor used to capture the image data. Such sensor information may include a device identifier, a sensor model identifier, orientation of the sensor at the time of capture, ambient conditions at the time of capture (e.g., ambient light level, temperature), whether a flash was used to capture the image data, intensity of the flash used to capture the image data, time of capture (e.g., date, hour, minute, second), geographic information indicating a geographic location (e.g., latitude and longitude or other location identifying information) where the image was taken, sensor parameters (e.g., aperture, exposure rate, shutter speed), contextual information for the image (e.g., beach scene, outdoor scene, snow scene, vacation, or other contextual information than can be used to infer the types of objects or subjects shown in the image), and the like.

The image includes a subject 120 and a background 150. In the simplified image shown in FIG. 1A, the subject 120 is a person and the background 150 is a door. It will be appreciated that the features described may be implemented using more complex images having more elaborate backgrounds and/or more subjects (e.g., 2, 3, 5, 10, or 12) or different subjects (e.g., women, children, cars, houses, dogs, boats, iguanas, skateboards) or a portion of the subject 120 (e.g., just the torso and head). To facilitate the feature extraction, the background 150 of the image shown in FIG. 1A may be removed. Removing the background 150 provides one non-limiting advantage of reducing the number of pixels, which are processed to extract the desired features. In some implementations, removing the background 150 may be referred to as segmenting the image.

Figure 1B:
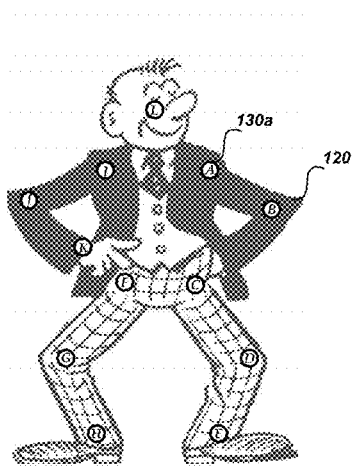
FIG. 1B is a pictorial diagram of the example image shown in FIG. 1A that has been segmented using feature extraction and includes structural references.

FIG. 1B is a pictorial diagram of the example image shown in FIG. 1A that has been segmented using feature extraction and includes structural references. The image shown in FIG. 1B includes the subject 120 without the background 150 (FIG. 1A). The image in FIG. 1B also includes twelve structural reference points labeled A through L. For example, structural reference 130*a* is structural reference point A located approximately at the left shoulder of the subject 120.

The structural references may be identified by providing the segmented image to a feature detection module. The response from the feature detection module may include a set of structural reference points indicating one or more locations of joints for the subject. As noted above, while the example focuses on a human as the subject 120, similar principles can be applied to determine structural references for other items such as cars (e.g., wheel location, windshield location, door location, etc.) or animals (e.g., paw location, tail base, tail tip, nose, etc.).

In some implementations, the structural reference may be predetermined for the subject 120. For example, the feature extraction system may receive an initial structural representation of the subject 120. This representation may be taken at a predetermined distance from the sensor using a standard pose. The image presented for feature extraction may also be taken at the predetermined distance using the standard pose. Because the structural representation and the image are captured at substantially similar distances and poses, the initial structural representation of the subject 120 may be aligned to the image presented for feature extraction. The representation may be selected from the storage using an identifier for the subject 120 included in the request for feature extraction or in the image data. Once the structural reference points are aligned to the provided image, the pixel-joint distance visual feature for pixels included in the segmented image may be generated.

Figure 1C:
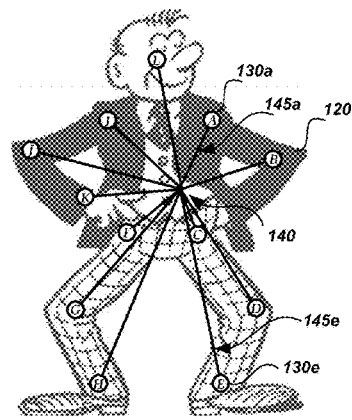
FIG. 1C is a pictorial diagram of the example image shown in FIG. 1B that has been segmented and includes distances the structural references and a given pixel.

FIG. 1C is a pictorial diagram of the example image shown in FIG. 1B that has been segmented and includes distances between the structural references and a given pixel. Pixels of the image of the subject 120 may be processed to determine the distance from a pixel to a respective structural reference. As shown in FIG. 1C, a pixel 140 is being processed. A first distance 145*a* from the pixel 140 to structural reference 130*a* is shown. A second distance 145*e* from the pixel 140 to structural reference 130*e* is also shown. The remaining lines from the pixel 140 to corresponding structural references represent respective distances from the pixel 140 to the structural reference. All or some of these distances may be stored as visual features of the pixel 140. In some implementations, distances that exceed a threshold may be excluded or stored as a "null" value indicating the distance as irrelevant to the pixel classification. For example, a pixel may be so remote from aligning with an ankle joint, that the ankle joint pixel distance may be represented using a negative number. In some implementations, a floor or ceiling value may be used to allow a range of distances to be used for each pixel-structural reference distance. This can provide resource efficiencies when representing the visual information such as reducing the amount of memory needed to maintain the feature data.

Figure 6:
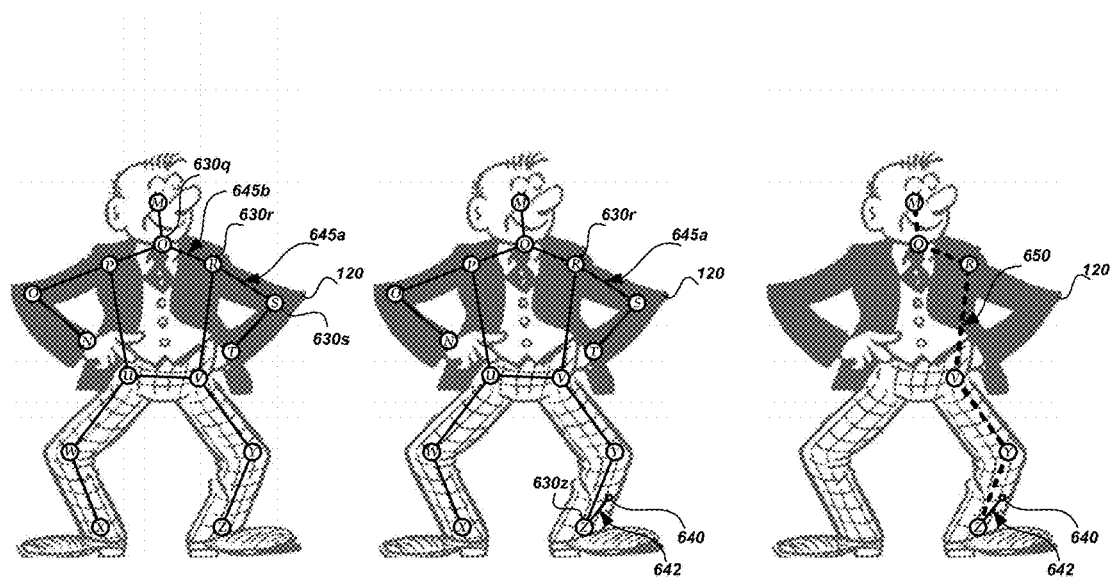
FIG. 6A is a pictorial diagram of the example image from FIG. 1A including another set of structural references.
FIG. 6B is pictorial diagram of an example of how the structural references from FIG. 6A may be used to classify a pixel within the example image.
FIG. 6C is a pictorial diagram of an example of a distance feature that may be generated to classify the pixel shown in FIG. 6B.

The distance may be an absolute value. For example, the distance may be provided as the number of pixel from the pixel 140 to the reference point. In some implementations, the distance may be a relative value. For example, the distance may be provided as the difference between distances for the pixel 140 and the first structural reference 130*a*, relative to the first pixel (e.g., pixel at location 0, 0) of the image. The distance information may be represented in other ways. For example, if depth information is included in the image, real-world scaling of the image can be performed using triangulation. In such implementations, a distance measurement such as inches, feet, centimeters, or the like may be calculated for a given pixel. In some implementations, the structural references may include information to indicate how each structural reference is related to one or more additional reference points. For human subjects, this may be referred to as a skeletal graph. FIG. 6A below illustrates one such graph. In such implementations, each structural reference point is a node within the graph. A node is connected by a path to one or more adjacent nodes. A pixels position relative to a node within the graph may be used to generate the distance for the pixel. FIGS. 6B and 6C (discussed in further detail below) depict one illustrative way to determine a distance for a pixel of interest.

The distance may be provided as a scalar value that includes the magnitude of the space between the pixel 140 and a reference point. In some implementations, it may be desirable to indicate distance using a vector that would include magnitude of the space between the pixel 140 and a reference point as well as a direction from the pixel 140 to the reference point. For example, a scalar representation of the first distance 145*a* may indicate a distance of 10 between the pixel 140*a* and the reference point 130*a*. A vector representation would include the distance as 10 and include information indicating below and to the left of the reference point 130*a*. The direction may be indicated using an angle from the vantage point of either the pixel 140*a* or the reference point. Which vantage point to use may be predetermined for the feature extraction processing such as via a configuration value.

The distances may be stored as part of the image data or in a format that can be associated with the image data. For example, a metadata file may be created that includes an identifier for the segmented image, and distances for each pixel-structural reference. Table 1 below is one example of how a portion of the information may be stored for a subject having three structural reference points.

TABLE 1

| Pixel X Image Location | Pixel Y Image Location | Distance to Reference 1 | Distance to Reference 2 | Distance to Reference 3 |
| --- | --- | --- | --- | --- |
| 0 | 0 | 10 | 8 | 10 |
| 0 | 1 | 9 | 8 | 9 |

TABLE 1-continued

| Pixel X Image Location | Pixel Y Image Location | Distance to Reference 1 | Distance to Reference 2 | Distance to Reference 3 |
| --- | --- | --- | --- | --- |
| 0 | 2 | 8 | 8 | 8 |
| 0 | 3 | 7 | 7 | 7 |
| ... | ... | ... | ... | ... |
| 526 | 526 | 416 | 397 | 415 |

Figure 2:
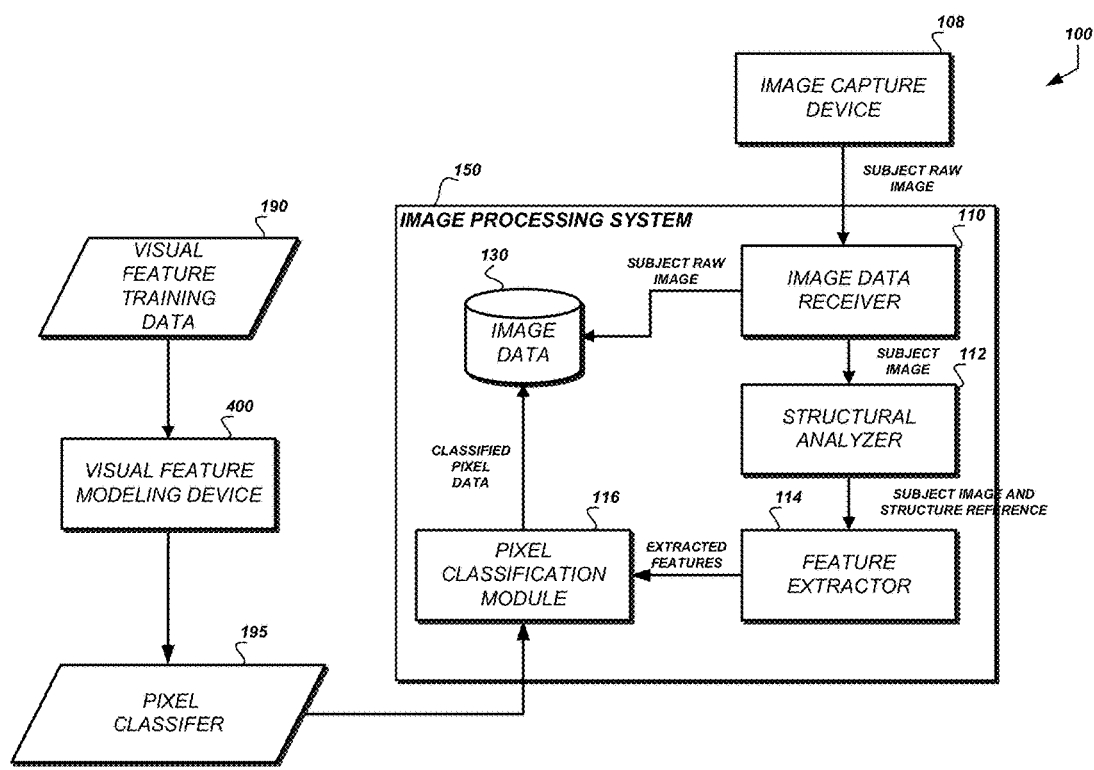
FIG. 2 is a functional block diagram of an image feature extraction system.

FIG. 2 is a functional block diagram of an image feature extraction system. As shown, an image capture device 108 transmits a raw image of the subject to an image processing system 150. The raw image may be a digital image encoding a scene including the subject using pixels. The image capture device 108 may be an electronic communication device configured to transmit machine readable messages to the image processing system 150. Examples of the image capture device 108 include, but are not limited to, a smartphone, a tablet computer, a desktop computer, a wearable computing device, a laptop computer, a set-top-box, a streaming media device, a feature phone, a camera, and a television. The raw image may be transmitted via messages formatted according to a standardized protocol such as TCP/IP, HTTP, FTP, or the like. The transmission may be via wired or wireless means. In some implementations, the image capture device 108 may be integrated within the image processing system 150.

The image processing system 150 may include an image data receiver 110. The image data receiver 110 may be configured as an initial interface to receive the raw image data from the image capture device 108. The image data receiver 110 may receive the raw image data via wired or wireless means from the image capture device 108. For example, the image capture device 108 may be coupled via a cable or wire to the image data receiver 110. As another example, the image capture device 108 may communicate via a standardized communication channel such as a local area network, wide area network, personal area network, near field communication, or another channel configured to exchange messages between two or more electronic devices.

The image data receiver 110 may be in data communication with an image data storage 130. The image data storage 130 may be configured to store the received image data such as the raw image of the subject. In some implementations, the image data receiver 110 may be configured to preprocess the raw image. For example, the image data receiver 110 may segment the raw image. In some implementations, the receiver 110 may normalize the image such as color correction, resizing, scaling, adjusting the number of pixels, or rotating the raw image according to preconfigured image criteria. The normalization criteria may be specified as a configuration provided to the image processing system 150.

The image data receiver 110 shown in FIG. 2 is in data communication with a structural analyzer 112. The structural analyzer 112 may be configured to identify structural references for the subject of the subject image. The image data receiver 110 may provide the subject image to the structural analyzer 112 directly or via an intermediary such as a buffer or work queue. When providing the subject image, the image data receiver 110 may provide the image data directly or a reference to image data stored in the image data storage 130. One example of the reference may be a unique identifier for the image.

The structural analyzer 112 may identify the structural references for the subject image using one or more techniques. For example, the structural analyzer 112 may be configured to access a structural modeling system to obtain the structural references. The structural modeling system may be accessed via a network through an exchange of messages such as via an application programming interface, web-service interface, or other interoperation.

In some implementations, the structural analyzer 112 may use a trained structural representation to predict the location of structural references for the subject. For example, machine learning may be used to train a structure representation that identifies locations of reference points based on the image data (e.g., color, pixel edges, contrast, etc.). In some implementations, the structural representation of the subject may be previously provided to the image processing system 150. In such implementations, the structural representation may be stored by the image processing system 150 and retrieved using an identifier for the subject such as a user identifier, an account name, a unique token, address, or other information that can identify the subject. When provided, the structural representation may be generated by an entity other than the subject. For example, if the subject is a customized car, the manufacturer of the stock version of the car may provide the structural reference points. Other methods of identifying structural references for the subject may be implemented by the structural analyzer 112 without departing from the scope of the application.

The structural analyzer 112 may be configured to normalize the structural reference information. The pixel classifier used to classify the pixels may be generated using structural data from many different subjects. In the case of humans, some are tall and others are short. Some are round and others long. These variations can impact the pixel classifier. As such, the structural reference may generate a normalization factor for distances using the structural reference. The normalization factor may be based on a ratio of a distance between a first and a second reference point (e.g., wrist and elbow) and the sum of the distances between all other pairings of reference points. Equation 1 provides an example expression that may be used to generate the normalization factor.

Equation 1

$$\frac{d(r_1, r_2)}{\sum_{n=0}^{x} \left( \sum_{m=0}^{x} d(r_n, r_n) \right)} \quad \text{Equation 1}$$

where $d(r_a, N_b)$ is the distance between reference point a and reference point b, the preselected reference locations for normalization; and x is the total number of reference points.

The structural analyzer 112 may be in data communication with a feature extractor 114. The feature extractor 114 may be configured to extract the visual feature for the subject image using the structure reference information. The feature extractor 114 may be configured to process one or more pixels in the subject image to identify a distance from the pixel to a structural reference. While the distance to one structural reference may be used, the more structural references considered may lead to an improved accuracy. For example, in FIG. 1C, twelve references are used. In some implementations fourteen references may be used. The specific number of references used may be determined based on the types of pixels to be classified. For example, if more detail is need, such as to identify jewelry items (e.g., rings, earrings, watches, or necklaces), more references may be used to provide more features to characterize a pixel. In other implementations, less than twelve or fourteen references may be used.

Once extracted, the visual features for the pixels may be classified by a pixel classifier 116. The extracted features may be provided to the pixel classification module 116 by the feature extractor 114. In some implementations, the extracted features may be stored in the image data storage 130 and retrieved by the pixel classification module 116 for classification. In such implementations, the pixel classification module 116 detects a value indicating the need to classify the subject image using the extracted features. The value may be stored in the image data storage 130 or transmitted to the pixel classification module 116 such as by the feature extractor 114.

The pixel classification module 116 also receives a pixel classifier 195. The pixel classifier 195 may be a neural network model, a logistic regression model, a logistic regression classifier, a linear classifier, a support vector machine, a random forest, or other ensemble learning model. A pixel's distance features may be provided to the pixel classifier 195 and used to generate a predicted category for the pixel. For example, the pixel classifier 195 may be trained to identify apparel items using pixel joint distances. The pixel classification module 116 may identify a pixel for classification and apply one or more of the extracted distance features for the pixel to the pixel classifier 195 to obtain a content type for the pixel. The predictions for multiple pixels in the subject image can be used to generate a probability mapping of content types for the pixels included in the subject image. This map may, in some implementations, be further processed to refine the classifications and boundaries between two possible content types. The refinement may include applying the pixel values to a second pixel classifier trained to distinguish specific content types.

In classifying or refining the classification for a pixel, the pixel classification module 116 may obtain additional information. For example, the pixel classifier 195 may also receive texture information, calculated color information (e.g., specific red, blue, or green color values, color space transformed values), depth information for a pixel, infrared information for a pixel, features including the pixel that are recognized (e.g., face), contextual information (e.g., beach scene, outdoor scene, snow scene, vacation, or other contextual information than can be used to infer the types of objects shown in the image), or previously identified features of the subject. For example, using the date information for an image, the subject's calendar or social media site may be visited to determine where and/or what the subject might have been doing at the time the picture was taken. Contextual information such as "in a meeting" or "beach day" can help narrow the set relevant objects (e.g., apparel items) the pixel can be classified as. For example, if the augmentation information indicates the subject was in the office, it is unlikely the subject was wearing pajamas. In some implementations, distances may be generated for recognized features (e.g., face) to the structure references. These distances may also be applied to the pixel classifier 195 to generate the classification.

Indicating which information to apply to a pixel classifier may be achieved within the pixel classifier. For example, the pixel classifier 195 may identify the input values that may be applied to the classifier. The pixel classification module 116 may process the pixel classifier 195 to first determine which values are needed. Then, the pixel classification module 116 may obtain the data for the pixel classifier 195 and apply the data once collected.

The pixel classifier 195 may be generated by a visual feature modeling device 400. The visual feature modeling device 400 generates the pixel classifier 195 using visual feature training data 190. The visual feature training data 190 may include visual features (e.g., distances), subject images, and classified pixels for the subject images. The classified pixels will be the "ground truth" classification that the pixel classifier 195 will be trained to replicate using the visual features. The visual feature modeling device 400 and training process are described in further detail with reference to FIG. 4 and FIG. 5.

The image processing system 150 may be included in a larger system configured to utilize the classified pixels. For example, a catalog system may use the identified apparel items to suggest new apparel items. In some implementations, a fashion "look" tracker application may provide a diary of apparel items worn by the subject over time. The diary may include the number of times particular items were worn, color preferences, texture preferences, and outfit combinations. By efficiently and accurately identifying the items, an intelligent system for suggesting outfits may be implemented and an effective history of item previously worn can be generated and made searchable using the apparel types.

Figure 3:
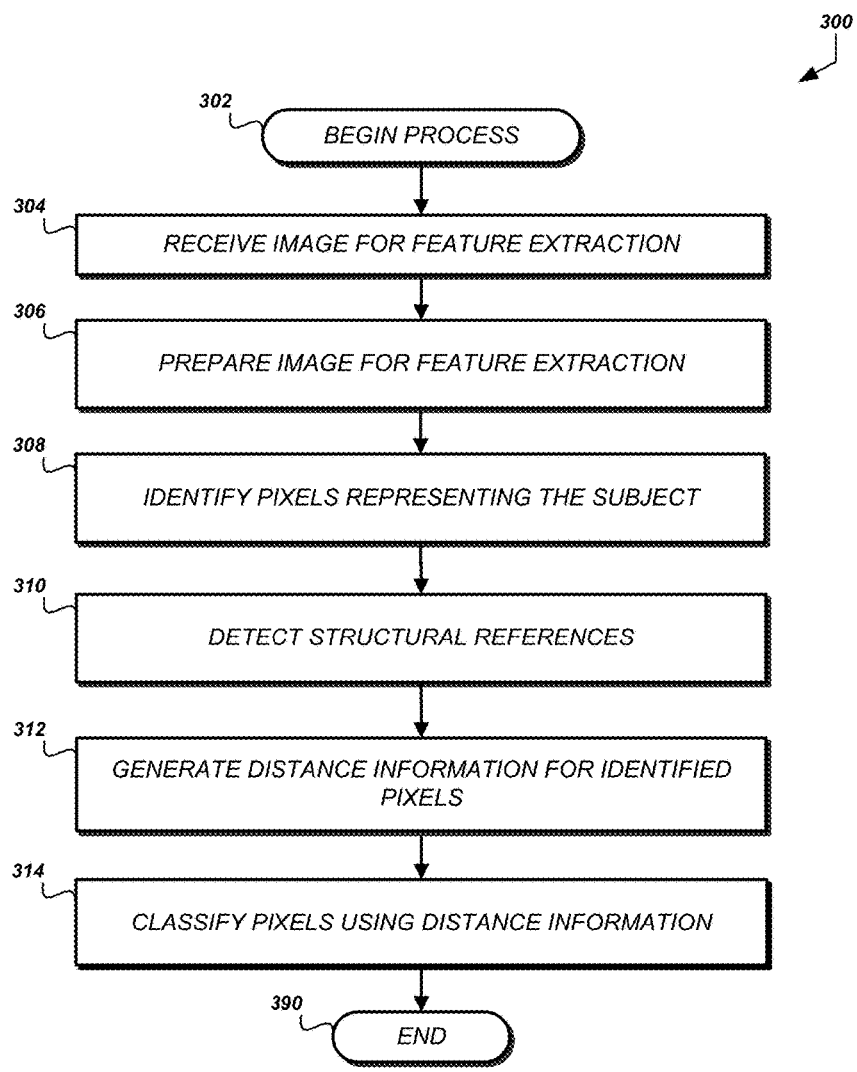
FIG. 3 is a process flow diagram of an example method of image feature extraction using pixel classification.

FIG. 3 is a process flow diagram of an example method of image feature extraction using pixel classification. The method 300 may be implemented in whole or in part by one or more of the devices described herein such as the image processing system 150 shown in FIG. 2.

The method 300 begins at block 302. At block 304, an image for feature extraction is received. The image may be a raw image or a pre-segmented image. At block 306, the received image is prepared for feature extraction. Preparing the image for feature extraction may include normalizing the size or color of the image, rotating the image, generating additional image data such as depth information or color information. At block 308, pixels are identified within the image data that represent the subject. For a raw image such as that shown in FIG. 1A, the identified pixels may be similar to the segmented image shown in FIG. 1B. If the received image was pre-segmented, the processing of block 308 may be omitted. At block 310, structural references are detected. The detection of structural references may include transmitting the image to a feature detection system such as a structural modeling system. In some implementations, pixel information may be applied to a trained structural representation to obtain predicted reference locations. Where the subject is a human, the structural references may include locations of skeletal joints. In some implementations, the detection may use a previously provided structural representation of the subject. In such implementations, the representation may be aligned with the subject shown in the received image.

At block 312, distance information for a pixel identified at block 308 is generated. The distance information may include the distance from the pixel to a structural reference. In some implementations, the distance information may include multiple distances, each distance indicating the space between the pixel and an associated structural reference. The distance information, as discussed, may be generated as a scalar or a vector. In some implementations, it may be desirable to selectively represent the data as scalar or vector data. For example, every tenth pixel may include vector data, while the intermediate pixels may include only scalar data. The selection may be controlled using a configuration indicating a frequency for a data type. In some implementations, generating the distance information may include normalizing the distance information for a pixel using a normalization factor such as discussed above.

At block 314, the pixels are classified using the distance information generated at block 312. The classification of a pixel includes applying a pixel classifier to the distance information for the pixel from block 312. The classification of block 314 may include storing the classification information for further processing.

In some implementations, the classification performed at block 314 may also include retrieving additional information for the pixel, for the subject, or for the device used to capture the image. For example, the depth information for a pixel may also be applied to the pixel classifier to classify the pixel.

In some implementations, the classification performed at block 314 may include iterative classification. For example, a first pixel classifier may be used for coarse grained classification of pixels. The coarse grained classification may be computationally efficient, but yield two or more equally likely classifications for a pixel. Once the reduced number of likely classifications is identified, a second pixel classifier may be identified to disambiguate between the likely classifications. This allows the system to more efficiently classify the pixels by spending minimal resources to narrow the candidate classifications and then utilizing a specially trained pixel classifier to perform a more detailed (e.g., computationally rigorous) analysis.

Figure 4:
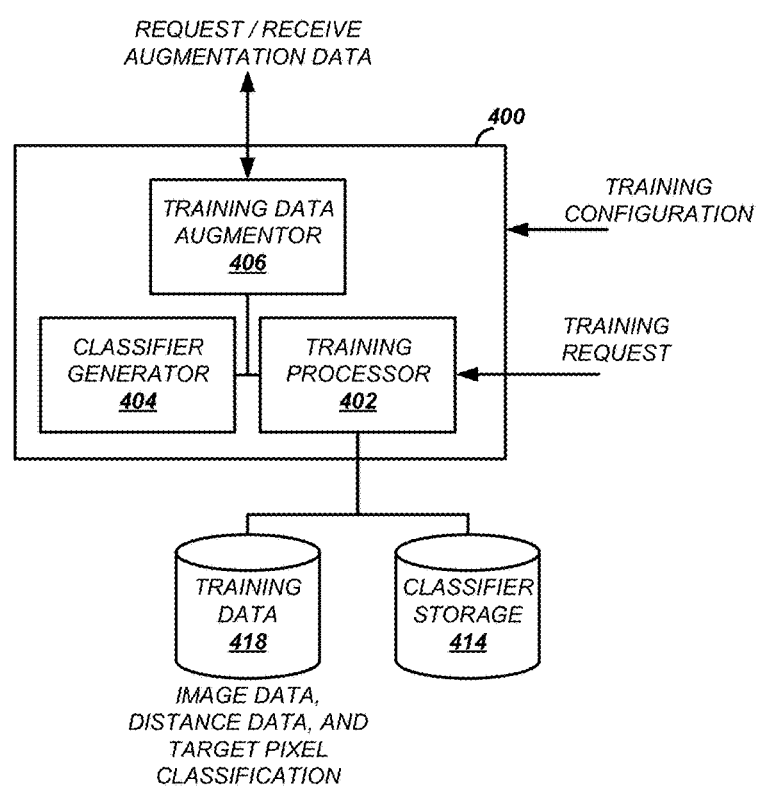
FIG. 4 is a functional block diagram of an example of a visual feature modeling device.

FIG. 4 is a functional block diagram of an example of a visual feature modeling device. The visual feature modeling device 400 may be used to train pixel classifiers, such as neural network models, deep neural network models, logistic regression models, linear classifiers, support vector machines, random forests, or other ensemble classifiers. The system 100 may include the visual feature modeling device 400 or be in data communication with the visual feature modeling device 400. The visual feature modeling device 400 shown in FIG. 4 is a simplified modeling device intended to highlight certain aspects of classifier training. The visual feature modeling device 400 may include additional elements including one or more of: a power source, memory, a transmitter, a receiver, a transceiver, or a network interface to expand or enhance the capabilities of the visual feature modeling device 400.

The visual feature modeling device 400 includes a training processor 402. The training processor 402 may be a specially configured processing device that coordinates the training of pixel classifiers. The training processor 402 may be implemented as a circuit or as an electronic device configured to execute one or more instructions to perform the pixel classifier training described.

The training processor 402 may receive a training configuration message. The training configuration message may include an identification of a pixel classifier to train, if retraining an existing classifier. The identification may be a value that is associated with the classifier data stored in a classifier storage 414. If the pixel classifier is not found in the classifier storage 414, the training processor 402 may be configured to create a new pixel classifier using the provided identification information. In some implementations, the training configuration message may be included in the classifier training request. In such implementations, the device requesting the training can specify the parameters for training such as the desired accuracy or training data for the requested classifier.

The training configuration message may also indicate the type of classifier to be trained. For example, the training processor 402 may be dynamically configurable to train classifiers using different learning techniques (e.g., neural network modeling, regression training, etc.).

The visual feature modeling device 400 may include a classifier generator 404. The classifier generator 404 may be configured to train a pixel classifier using an identified set of training data, such as images that have been previously classified. The training may include adjusting the parameters of the classifier such that the classification generated by the classifier for the training data matches the "ground truth" classification previously identified for the pixel. The classifier generator 404 may receive one or more messages identifying the classifier and data set for training. Once the training request is received, the classifier generator 404 may be configured to obtain the identified pixel classifier from the classifier storage 414. If no classifier is identified, a new pixel classifier may be constructed.

The classifier generator 404 may also be configured to obtain the identified training data from a training data storage 418. In some implementations, the training data may be obtained from the image data storage 130. For example, once images have had the pixels classified, a confidence for the classification may be stored for the image. The confidence indicates the likelihood that the classifier "correctly" predicted the classification for the pixel. Images that have a high confidence (e.g., 90% or greater confidence, or generalization error less than a threshold), may be used to train classifiers. In some implementations, the training data may include hand classified pixel information. For example, a user may select portions of an image such as via a touchscreen and select a classification for one of the selected portions.

Once trained, the pixel classifier may be stored in the classifier storage 414. It will be appreciated that a system may include several pixel classifiers. For example, one pixel classifier may be generated and used for coarse grained apparel classification, while a second classifier may be generated and used for classifying menswear or pants. Accordingly, apparel type may be a factor in deciding which classifier to use for a given image. The classifier storage 414 may be configured to provide pixel classifiers to the pixel classification module 116 as described above.

In some implementations, it may be desirable to augment the data used to train the classifier. In such implementations, a training data augmentor 406 may be included in the training device 400. The training data augmentor 406 may be configured to generate additional training data from the obtained training data. For example, the training data augmentor 406 may generate additional pixel information such as depth or color information not included in the training data. The training data augmentor 406 may be configured to request augmentation data such as weather information at the time and place the image was taken from a networked weather information service. The location of the service (e.g., URL) may be included in the training configuration provided to the visual feature modeling device 400. A response may be received by the training data augmentor 406. The augmentation data may be stored in the training data storage 418. The augmentation may include, as discussed above, retrieving contextual information (e.g., beach scene, outdoor scene, snow scene, vacation, or other contextual information than can be used to infer the types of objects shown in the image). In some implementations, the augmentation may include retrieving information from a catalog. For example, if the training data identifies an item as particular brand of shirt, a catalog may include additional details that may be useful to augment the image training such as fabric type, color, or detailed apparel type information (e.g., "formal dress shirt" as opposed to just "shirt").

Figure 5:
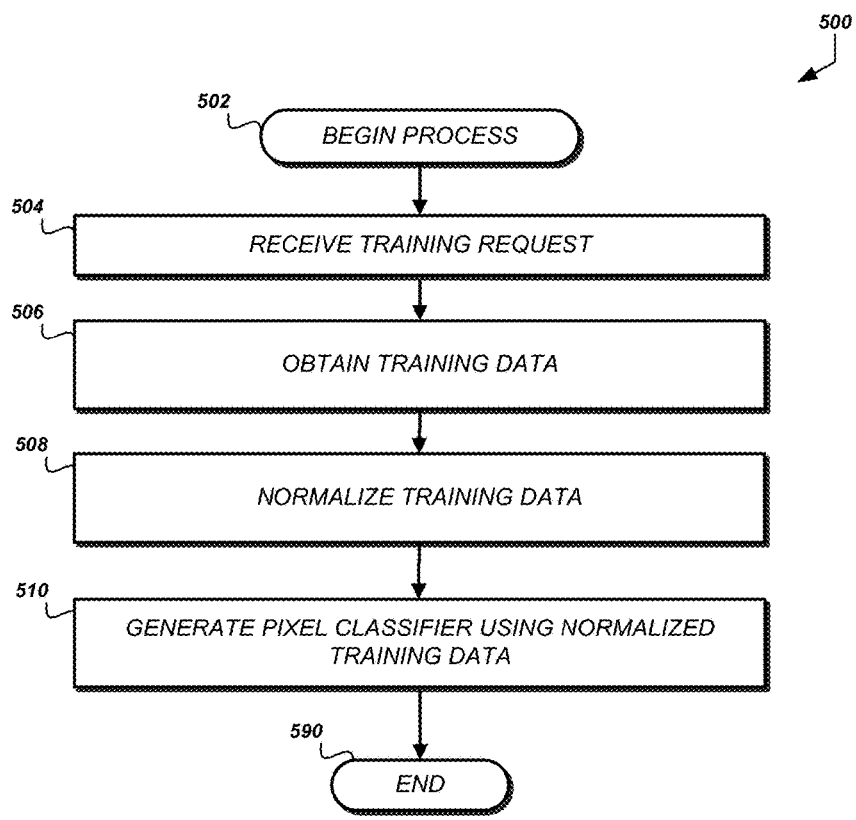
FIG. 5 is a process flow diagram of an example method of generating a pixel classifier.

FIG. 5 is a process flow diagram of an example method of generating a pixel classifier. The method shown in FIG. 5 may be implemented in whole or in part by one or more of the devices described herein such as the visual feature modeling device 400 shown in FIG. 1 or FIG. 4.

The method 500 begins at block 502. At block 504 a training request may be received by the visual feature training device 400. The training request may include an identifier for a model to train where an existing model is going to undergo additional training. The training request may include an identifier of training data or a set of training data to use for training the model. The training request may, in some implementations, include training parameters such as the number of training iterations to perform, target confidence, or other information to control the initiation and/or termination of the training process.

At block 506, training data is obtained. The training data may be obtained from a training data storage such as the training data storage 418. In some implementations, the training data may be obtained from an image data storage such as the image data storage 130 of the image processing system 150. Obtaining the training data at block 506 may include augmenting the training data as described with reference to FIG. 4. The training data includes pixel distance information to one or more structural references. The training data also includes a pre-determined classification for the pixel. This pre-determined classification is the target classification for the pixel that should be generated by the pixel classifier, if trained properly.

At block 508, the training data is normalized. One type of normalization is image normalization. Because the images may have been obtained by different sensors, the size and number of pixels of the image may be normalized. Another normalization that may be implemented is structural normalization. At discussed above, in implementations such as apparel type classification, different people have different structures. As such, when training the pixel classifier for use with a subject that is not known ahead of time, the pixel classifier may be trained using normalized distances. The normalization may be performed as discussed above, such as with reference to Equation 1.

At block 510, a pixel classifier is generated using the normalized training data from block 508. For example, if the pixel classifier is a neural network model, the pixel classifier is trained by adjusting the weights of the paths correspond to the target classifications (e.g., apparel types). The training process may be feedforward neural network modeling with back-propagation for updating the weights between nodes of the neural network. The training process may be iteratively adjusting parameters of an equation such as via a genetic algorithm. Other machine learning techniques such as supervised learning techniques (e.g., decision trees, regression classifiers, support vector machines, etc.), structured prediction models (e.g., probabilistic graphical models), or the like may be applied to generate classifier. The training at block 510 may include storing the pixel classifier in a classifier storage device such as the classifier storage 414. In some implementations, the model may be transmitted or otherwise provided to an image processing system.

The pixel classifier may further include information about the inputs that may be applied to the pixel. For example, if the distance to reference features can be used to generate predictions, the reference feature distances that may be provided can be described in the pixel classifier. Other data that may be included as an input to the pixel classifier may be indicated in the pixel classifier (e.g., sensor type, ambient conditions, candidate classification types, etc.). The pixel classifier may include the descriptive information in the same file as the classifier or in a separate descriptor file. When stored separate from the pixel classifier, when providing the pixel classifier, the descriptor file is also provided.

One example pixel classifier may receive reference feature distance and provide a classification as the output. The classification may be provided in numerical form where the number represents a classification. Another example of a pixel classifier may provide the classification and a confidence as the outputs. In such implementations, the confidence may indicate the probability the provided classification is "correct" or, for some classifiers, an error rate. As another example of a pixel classifier, the output may include probabilities for each possible classification. For example, if there are five apparel types that can be represented by a pixel, the output for a given pixel may be a list of five probabilities, each associated with one apparel type. In such implementations, the likelihood of any one apparel type being represented by the pixel can be assessed. Any of these example classifiers may receive additional information for the pixel or other augmentation data as described to generate the respective output(s).

FIG. 6A is a pictorial diagram of the example image from FIG. 1A including another set of structural references. As in FIG. 1A, the image shown in FIG. 6A includes the subject 120. The image in FIG. 6A also includes fourteen structural reference points labeled M through Z. For example, structural reference 630r is structural reference point R located approximately at the left shoulder of the subject 120. Each of the structural references shown in FIG. 6A also includes at least one path to another structural reference. For example, the structural reference 603r has a path 345a to structural reference 630s and another path 646b to structural reference 630q. Each path is associated with a distance indicating an amount of space between the nodes (e.g., structural references) connected by the path. The collection of structural references and paths form a structural graph for the subject 120.

FIG. 6B is pictorial diagram of an example of how the structural references from FIG. 6A may be used to classify a pixel within the example image. In FIG. 6B, a pixel of interest 640 is shown. The pixel of interest 640 is the pixel for which a classification is desired. To determine the distance feature for this pixel, it may be desirable to identify the distance of the pixel, via the structural graph, to a predetermined structural reference. For example, the head (identified by structural reference 630m) may be the point to which all distances are measured. To measure the distance, a nearest node within the structural graph to the pixel may be identified. As shown in FIG. 6B, the distance 642 from the pixel of interest to structural reference 630z is the shortest. That is, the structural reference which is located closes to the pixel of interest 640 is structural reference 630z. As shown in FIG. 6B for pixel of interest 640, the nearest node would be identified as structural reference 640z.

FIG. 6C is a pictorial diagram of an example of a distance feature that may be generated to classify the pixel shown in FIG. 6B. Having identified the nearest node, a node path 650 from the nearest node to the predetermined structural reference is identified. A node path is a sequence of connected nodes that may be traversed from a starting node to an ending node. The identification of the node path includes identifying the node path including the smallest number of nodes to traverse the structural graph from the starting node to the ending node. In FIG. 6C, the node path Z-Y-V-R-Q-M is identified. The distance for the node path may be generated by summing the intermediate paths between the nodes traversed. For example, for the node path 650, the distance information determined for the pixel of interest 640 may be expressed as:

distance of path from Z to Y+
distance of path from Y to V+
distance of path from V to R+
distance of path from R to Q+
distance of path from Q to M.

In some implementations, the node path distance may be used to generate the final distance feature. For example, it may be desirable to account for the distance 642 between the pixel of interest 640 and the nearest node 630z. As noted above, the distance values may include a magnitude and a direction. Furthermore, the distances may be expressed in units such as pixels, triangulated real-word distances, or, in implementations using a structural graph, the number of paths traversed or the number of nodes traversed.

Figure 7:
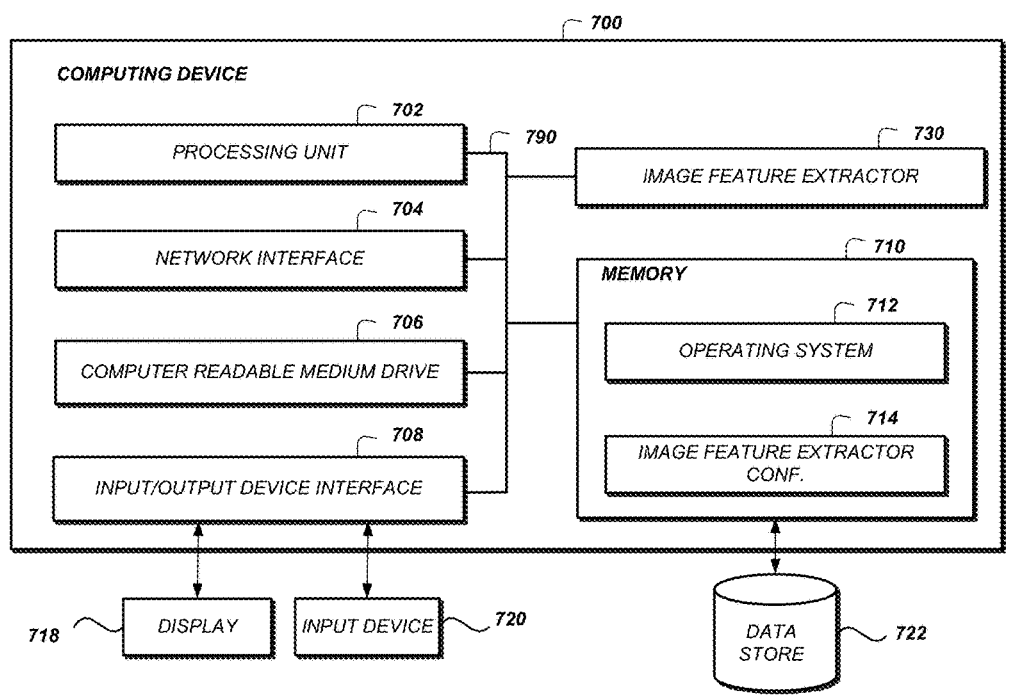
FIG. 7 is a functional block diagram of a computing device for pixel-structural reference image feature extraction.

FIG. 7 is a functional block diagram of a computing device for pixel-structural reference image feature extraction. The computing device 700 can be a server or other computing device, and can comprise a processing unit 702, an image feature extractor 730, a network interface 704, a computer readable medium drive 706, an input/output device interface 708, and a memory 710. The network interface 704 can provide connectivity to one or more networks or computing systems. The processing unit 704 can receive information and instructions from other computing systems or services via the network interface 704. The network interface 704 can also store data directly to memory 710. The processing unit 702 can communicate to and from memory 710 and output information to an optional display 718 via the input/output device interface 708. The input/output device interface 708 can also accept input from the optional input device 720, such as a keyboard, mouse, digital pen, microphone, mass storage device, etc.

The memory 710 contains computer program instructions that the processing unit 702 executes in order to implement one or more embodiments. The memory 710 generally includes RAM, ROM, and/or other persistent, non-transitory computer readable media. The memory 710 can store an operating system 712 that provides computer program instructions for use by the processing unit 702 or other elements included in the computing device in the general administration and operation of the computing device 700. The memory 710 can further include computer program instructions and other information for implementing aspects of the present disclosure.

For example, in one embodiment, the memory 710 includes an image feature extractor configuration 714. The image feature extractor configuration 714 may include one or more pixel classifiers (or pointer thereto), classification relatedness thresholds, and/or augmentation data as described above. The image feature extractor configuration 714 may store specific values for a given configuration. The image feature extractor configuration 714 may, in some implementations, store information for obtaining values for a given configuration. For example, a pixel classifier for images including children may be specified as a network location (e.g., URL) in conjunction with username and password information to access the model.

The memory 710 may also include or communicate with one or more auxiliary data stores, such as data store 722. The data store 722 may electronically store data regarding classification models, apparel types, images, sensors, training data, and the like.

The elements included in the computing device 700 may be coupled by a bus 790. The bus 790 may be a data bus, communication bus, or other bus mechanism to enable the various components of the computing device 700 to exchange information.

In some embodiments, the computing device 700 may include additional or fewer components than are shown in FIG. 7. For example, a computing device 700 may include more than one processing unit 702 and computer readable medium drive 706. In another example, the computing device 702 may not be coupled to a display 718 or an input device 720. In some embodiments, two or more computing devices 700 may together form a computer system for executing features of the present disclosure.

The various aspects of pixel-structural reference image feature extraction described may be implemented in a variety of forms. In one implementation, a system is provided that includes a computer-readable memory storing executable instructions and one or more computer processors in communication with the computer-readable memory. The processors are configured to execute instructions to receive a digital image showing a person, wherein the digital image includes pixels and obtain a structural representation for the digital image. The executed instructions also cause identification, within the digital image, of a structural reference of the person using the structural representation applied to the pixels included in the digital image. The system, via the instructions executed by the processor, may also determine a distance between a first pixel included in the digital image and the structural reference of the person within the digital image and obtain a pixel classifier for the pixels included in the digital image. The processors of the system also execute instructions to predict an apparel type for the first pixel included in the digital image using the pixel classifier applied to the distance between the first pixel included in the digital image and the structural reference of the person.

In some implementations of the system, the computer processors may be further configured to execute the executable instructions to determine at least one of color information or depth information for the first pixel and predict the apparel type for the first pixel included in the digital image using the pixel classifier applied to the distance between the first pixel included in the digital image and the structural reference of the person within the digital image, and the at least one of the color information or depth information for the first pixel.

Instructions for normalizing the distance using a sum of a first distance between a first pair of structural references of the person and a second distance between a second pair of structural references of the person may be provided in some implementations of the system. The system may include instructions to isolate a portion of the digital image including the person, wherein the isolated portion includes the first pixel.

Another implementation may be a computer-implemented method. Under control of one or more computing devices configured with specific computer-executable instructions, the method may include identifying, within a digital image of a subject, a structural reference for the subject, determining a distance (e.g., magnitude and/or direction) between a pixel included in the digital image and the structural reference for the subject that is identified within the digital image of the subject, and classifying the pixel into a category of content based at least in part on the distance between the pixel included in the digital image and the structural reference for the subject.

Some embodiments of the computer-implemented method include obtaining an identifier for the subject and using the identifier to retrieve a structural reference model for the subject. In such implementations, the structural reference is then identified using the structural reference model. For example, the structural reference model may be aligned with the digital image of the subject.

The computer-implemented method may include determining at least one of color information or depth information for the pixel. In such implementations, classification of the pixel may be based on the at least one of the color information or depth information for the pixel.

The structural reference may be one node within a structural graph. Each node included in the structural graph has a path to at least one other node included in the structural graph. In such implementations, the method includes identifying a nearest node within the structural graph, the nearest node being a node of the structural graph located closest to the pixel, and identifying a node path within the structural graph from the nearest node to the structural reference. The distance between the pixel and the structural reference main include a length of the node path within the structural graph from the nearest node to the structural reference.

The computer-implemented method may be embodied as computer-executable modules of a computer-readable, non-transitory storage medium. Such an embodiment may include an image data receiver module configured to at least receive image data including a digital image of a subject. The embodiment may also include a structural analyzer module configured to at least identify, within the digital image of a subject, a structural reference for the subject. A feature extractor module may be included and configured to at least determine a distance between a pixel included in the digital image and the structural reference for the subject that is identified within the digital image of the subject. The embodiment may also include a pixel classifier module configured to at least classify the pixel into a category of content based at least in part on the distance between the pixel included in the digital image and the structural reference for the subject.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as an image processing device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing device can be or include a microprocessor, but in the alternative, the image processing device can be or include a controller, microcontroller, or state machine, combinations of the same, or the like configured to receive and process image data. An image processing device can include electrical circuitry configured to process computer-executable instructions. Although described herein primarily with respect to digital technology, an image processing device may also include primarily analog components. For example, some or all of the image processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by an image processing device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the image processing device such that the image processing device can read information from, and write information to, the storage medium. In the alternative, the storage medium can be integral to the processor device. The image processing device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A system comprising:
a computer-readable memory storing executable instructions; and
one or more computer processors in communication with the computer-readable memory, wherein the one or more computer processors are configured to execute the executable instructions to at least:
generate a normalized spatial distance between a structural reference of a subject in an image and a pixel in the image based at least in part on:
(i) a spatial distance between the structural reference and the pixel,
(ii) a first distance between a first pair of structural references of the subject, and
(iii) a second distance between a second pair of structural references of the subject; and
adjust a parameter included in a pixel classifier based at least in part on a category of content for the pixel, the normalized spatial distance, and the structural reference,
wherein the pixel classifier, including the parameter as adjusted, receives the normalized spatial distance and the structural reference as input values and provides an output value indicating the category of content.

2. The system of claim 1, wherein the one or more computer processors are further configured to execute the executable instructions to at least:
determine at least one of color information or depth information for the pixel; and
adjust the parameter included in the pixel classifier based at least in part on the category of content for the pixel, the normalized spatial distance, the structural reference, and the at least one of the color information or depth information for the pixel,
wherein the pixel classifier, including the parameter as adjusted, receives the normalized spatial distance, the structural reference, and the at least one of color information or depth information for the pixel as input values.

3. The system of claim 1, wherein the one or more computer processors are further configured to execute the executable instructions to at least:
determine direction information for the spatial distance between the structural reference and the pixel; and
adjust the parameter included in the pixel classifier based at least in part on the category of content for the pixel, the normalized spatial distance, the structural reference, and the direction information,
wherein the pixel classifier, including the parameter as adjusted, receives the normalized spatial distance, the structural reference, and the direction information as input values.

4. The system of claim 1, wherein the pixel classifier further provides a result confidence value, and wherein a first result confidence value provided by the pixel classifier after adjusting the parameter indicates a higher level of confidence than a second result confidence value provided by the pixel classifier before adjusting the parameter.

5. The system of claim 4, wherein the one or more computer processors are further configured to execute the executable instructions to at least:
determine the first result confidence value does not correspond to a threshold confidence value; and
adjust the parameter included in the pixel classifier based at least in part on the category of content, the normalized spatial distance, the structural reference, and a difference between the first result confidence value and the threshold confidence value.

6. The system of claim 1, wherein the structural reference comprises a node within in a structural graph having a plurality of nodes, wherein each node included in the structural graph has a path to at least one other node included in the structural graph, and
wherein the one or more computer processors are further configured to execute the executable instructions to at least:
identify a nearest node within the structural graph, the nearest node being a node of the structural graph located closest to the pixel; and
identify a node path within the structural graph from the nearest node to the structural reference; and
wherein the spatial distance comprises a length of the node path within the structural graph from the nearest node to the structural reference.

7. The system of claim 1, wherein the one or more computer processors are further configured to execute the executable instructions to at least:
transmit, to another computing device, a request including information associated with at least one of: the category of content, a location where the image was captured, or temporal information identifying when the image was captured;
receive, from the another computing device, augmentation data for training the pixel classifier; and
adjust the parameter included in the pixel classifier further based at least in part on the augmentation data,
wherein the input values further comprise the augmentation data.

8. The system of claim 1, wherein the pixel classifier comprises a logistic regression model, and wherein the parameter comprises a coefficient included in the logistic regression model, and wherein the one or more computer processors are configured to execute the executable instructions to adjust the parameter by at least adjusting the coefficient included in the logistic regression model.

9. The system of claim 1, wherein the pixel classifier comprises a neural network including at least a first node and a second node, and wherein the parameter comprises an activation weight between the first node and the second node, and wherein the one or more computer processors are configured to execute the executable instructions to adjust the parameter by at least adjusting the activation weight between the first node and the second node.

10. The system of claim 1, wherein the one or more computer processors are further configured to execute the executable instructions to at least receive a training request message including information identifying the image and a pixel classifier type for the pixel classifier to be trained.

11. A computer-implemented method comprising:
under control of one or more processors configured with specific computer-executable instructions,
generating a normalized spatial distance between a structural reference of a subject in an image and a pixel in the image based at least in part on:
(i) a spatial distance between the structural reference and the pixel, and
(ii) a first distance between a first pair of structural references of the subject, and
(iii) a second distance between a second pair of structural references of the subject;
adjusting a parameter included in a pixel classifier based at least in part on a category of content for the pixel, the normalized spatial distance, and the structural reference;
receiving, by the pixel classifier including the parameter as adjusted, the normalized spatial distance and the structural reference as input values; and providing, by the pixel classifier including the parameter as adjusted, an output value indicating the category of content.

12. The computer-implemented method of claim 11, further comprising:
   determining at least one of color information or depth information for the pixel; and
   adjusting the parameter included in the pixel classifier based at least in part on the category of content for the pixel, the normalized spatial distance, the structural reference, and the at least one of the color information or depth information for the pixel,
   wherein the pixel classifier, including the parameter as adjusted, receives the normalized spatial distance, the structural reference, and the at least one of color information or depth information for the pixel as input values.

13. The computer-implemented method of claim 11, further comprising:
   determining direction information for the spatial distance between the structural reference and the pixel; and
   adjusting the parameter included in the pixel classifier based at least in part on the category of content for the pixel, the normalized spatial distance, the structural reference, and the direction information,
   wherein the pixel classifier, including the parameter as adjusted, receives the normalized spatial distance, the structural reference, and the direction information as input values.

14. The computer-implemented method of claim 11, wherein the pixel classifier further provides a result confidence value, and wherein a first result confidence value provided by the pixel classifier after adjusting the parameter indicates a higher level of confidence than a second result confidence value provided by the pixel classifier before adjusting the parameter.

15. The computer-implemented method of claim 14, further comprising:
   determining the first result confidence value does not correspond to a threshold confidence value; and
   adjusting the parameter included in the pixel classifier based at least in part on the category of content, the normalized spatial distance, the structural reference, and a difference between the first result confidence value and the threshold confidence value.

16. The computer-implemented method of claim 11, wherein the structural reference comprises a node within in a structural graph having a plurality of nodes, wherein each node included in the structural graph has a path to at least one other node included in the structural graph, and
   wherein the computer-implemented method further comprises:
      identifying a nearest node within the structural graph, the nearest node being a node of the structural graph located closest to the pixel; and
      identifying a node path within the structural graph from the nearest node to the structural reference; and
   wherein the spatial distance comprises a length of the node path within the structural graph from the nearest node to the structural reference.

17. The computer-implemented method of claim 11, further comprising:
   transmitting, to another computing device, a request including information associated with at least one of: the category of content, a location where the image was captured, or temporal information identifying when the image was captured;
   receiving, from the another computing device, augmentation data for training the pixel classifier; and
   adjusting the parameter included in the pixel classifier further based at least in part on the augmentation data,
   wherein the input values further comprise the augmentation data.

18. The computer-implemented method of claim 11, wherein the pixel classifier comprises a logistic regression model, and wherein the parameter comprises a coefficient included in the logistic regression model, and wherein the method comprises adjusting the parameter by at least adjusting the coefficient included in the logistic regression model.

19. The computer-implemented method of claim 11, wherein the pixel classifier comprises a neural network including at least a first node and a second node, and wherein the parameter comprises an activation weight between the first node and the second node, and wherein the method comprises adjusting the parameter by at least adjusting the activation weight between the first node and the second node.

20. The computer-implemented method of claim 11, further comprising:
   receiving a training request message including an identifier for the pixel classifier to be trained; and
   retrieving, from a model storage device, the pixel classifier based at least in part on the identifier.

* * * * *